United States Patent [19]

Wray

[11] Patent Number: 5,446,766
[45] Date of Patent: Aug. 29, 1995

[54] DIGITAL COMMUNICATION SYSTEMS

[75] Inventor: Anthony Wray, Basingstoke, United Kingdom

[73] Assignee: Motorola, Schaumburg, Ill.

[21] Appl. No.: 39,268

[22] PCT Filed: Aug. 13, 1992

[86] PCT No.: PCT/EP92/01853
§371 Date: Apr. 8, 1993
§102(e) Date: Apr. 8, 1993

[87] PCT Pub. No.: WO93/04544
PCT Pub. Date: Mar. 4, 1993

[30] Foreign Application Priority Data

Aug. 15, 1991 [GB] United Kingdom ............... 9117645

[51] Int. Cl.6 ............................................. H03D 3/24
[52] U.S. Cl. ............................ 375/373; 375/354; 370/104.1
[58] Field of Search ......................... 375/118, 119, 120; 328/55, 155; 307/262, 269

[56] References Cited

U.S. PATENT DOCUMENTS 4,630,267 12/1986 Costes et al. .
4,644,567 2/1987 Artun et al. .
4,795,985 1/1989 Gailbreath, Jr. ..................... 375/119

FOREIGN PATENT DOCUMENTS 0371500 6/1990 European Pat. Off. .

Primary Examiner—Stephen Chin
Assistant Examiner—William Luther
Attorney, Agent, or Firm—Randall S. Vaas

[57] ABSTRACT

This invention relates to a clock synchronisation circuit and a method of synchronising a clock signal with a received data signal in a digital communications system such as a burst-mode TDMA system. The clock synchronisation circuit comprises a clock for providing the clock signal having a frequency which is greater than the signal frequency of the received data signal by a predetermined amount, and logic means, such as an AND gate and divider, for logically combining the clock signal with the received data signal to provide an approximate synchronisation signal. The approximate synchronisation signal provides a synchronisation signal for the digital communications system The circuit further comprises comparing means for comparing the approximate synchronisation signal with the receive d data signal and for generating an error signal in response to the difference therebetween, and delay circuitry coupled to the clock and logic means for delaying the clock signal in response to the error signal so as to reduce the difference between the approximate synchronisation signal and the received data signal. In a preferred embodiment, the clock synchronisation circuit successively introduces delays to the clock signa in response to transitions of the synchronisation word in the received data until the approximate synchronisation signal is synchronised to the received data signal.

14 Claims, 4 Drawing Sheets

DIGITAL COMMUNICATION SYSTEMS

FIELD OF THE INVENTION

This invention relates to a clock synchronisation circuit and to a method for synchronising a clock signal to a received data signal for digital communication systems.

BACKGROUND OF THE INVENTION

Digital communication systems require accurate clock recovery or clock synchronisation techniques to achieve the lowest possible bit error rate in the received information. In Time Division Multiple Access (TDMA) systems information is communicated in specific time slots. In burst-mode TDMA systems, the transceiver of the digital communication system transmits on one time slot and receives on another: for example, in the Digital European Cordless Telecommunications system (DECT) the transceiver transmits on the first time slot and receives on the thirteenth. Since information is only communicated at set time intervals, it is particularly important that accurate clock synchronisation is achieved.

Typically, a synchronisation word precedes the data to be received so that the transceiver clock has a very short period during the synchronisation word in which to synchronise itself to the following data.

The ability of the transceiver to synchronise its clock accurately to the received data has a significant affect on the overall system performance and its ability to recover the received data accurately. If the transceiver clock and received data are unsynchronised, errors can be introduced on decoding of the received data. This is highlighted in noisy conditions. Thus, accurate clock synchronisation techniques are required to achieve the lowest possible bit error rate in the received data signal.

Present burst-mode TDMA systems, such as the CT-2 system which has a data rate of 72Kbit/s, use clocks having frequencies which are faster than the received data rate, for example 16, 32 or even 64 times faster: the transceiver clock generates the clock signal on receiving the first transition of the synchronisation word. Since the clock signal is not generated until the first transition is received, there is an error in the synchronisation. This error is acceptable for low data rate systems such as the CT-2 system. However, for higher data rate systems over 100Kbit/s, such as DECT having a data rate of 1.152Mbit/s, such an error may not be acceptable so that expensive and/or power consuming crystals and control circuitry are required in order to produce a fast enough clock signal to achieve a reasonable bit error rate.

Another method of achieving clock synchronisation in burst-mode communication systems includes utilising phase-lock circuits. However, phase-lock techniques can require significant space and power and this increases as the data rate gets higher. This would be a major disadvantage in transceivers for use in portable communications products. Furthermore, burst-mode communications systems would require complex phase-lock circuits which increases the cost of such systems.

A software controlled method may also be used to achieve clock synchronisation in burst-mode communications systems. However, as the system data rates increase, the software implementation becomes extremely complex and requires the use of expensive and power consuming microprocessors and a substantial amount of memory. As with large, power consuming phase-lock circuits, the space and power of such circuits would be a major disadvantage for transceivers for portable communications products.

Accordingly, the invention seeks to provide an improved clock synchronisation circuit and method of synchronising a clock signal in which the above problems of the prior art are mitigated.

SUMMARY OF THE INVENTION

In accordance with the present invention there is provided a method and apparatus for synchronising a clock signal with a received data signal in a digital communications system. The clock signal has a signal frequency which is greater than the signal frequency of the received data signal by a predetermined amount. This clock signal is logically combined with the received data signal to provide an approximate synchronisation signal. The approximate synchronisation signal is compared with the received data signal and an error signal dependent on the difference between the approximate synchronisation signal and the received data signal is generated. In response to the error signal, the clock signal is delayed so as to reduce the difference between the approximate synchronisation signal and the received data signal.

BRIEF DESCRIPTION OF THE DRAWINGS

Two embodiments of the present invention will now be described, by way of example only, with reference to the accompanying drawings in which.

DETAILED DESCRIPTION

A preferred embodiment of the present invention addresses synchronising a clock signal with a received data signal. A delayed clock signal is logically combined with the received data signal, until the approximate synchronisation signal is synchronised to the received data signal. It will be appreciated from the following description that an accurate clock synchronisation can be achieved without the need for large, complex and power consuming circuitry which are required in previous techniques.

Furthermore, since a clock delay technique is used in the preferred embodiment to control the error signal generated by the difference between the received data and the clock signal, errors in synchronisation can be removed even at high data rates without the need for expensive faster running clocks. For example, the clock which is used in the CT-2 burst mode TDMA system and which is relatively inexpensive and easily available, can be used by the present invention in a digital communications system having a data rate of 1Mbit/s.

Figure 1:
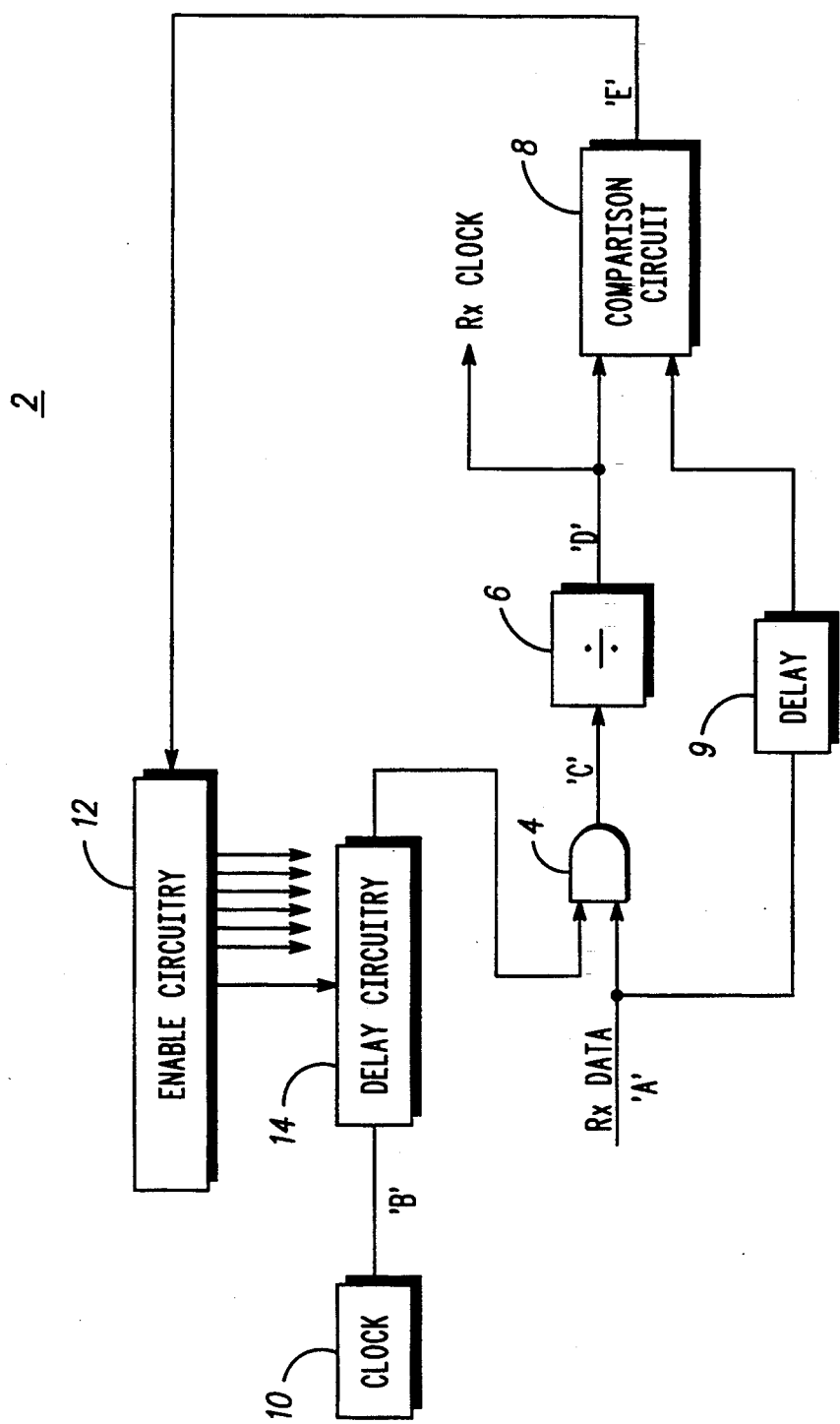
FIG. 1 shows a block schematic diagram of a first clock synchronisation circuit of a digital communications system in accordance with the present invention.

FIG. 1 is a block schematic diagram of a first clock synchronisation circuit 2 in accordance with a preferred embodiment of the present invention. The other parts of the digital communications system such as the antenna and data demodulating means are not shown but it would be apparent to a person skilled in the art that the clock synchronisation circuit 2 is part of a transceiver or receiver in a digital communications system.

An incoming data signal (A) is received at the antenna (not shown) of the transceiver (not shown) and after decoding is fed to one input of an AND gate 4. The received data signal A is also fed to a first input of a comparison circuit 8 via a delay 9.

A clock 10 generates a clock signal B which is coupled to a second input of the AND gate 4. The output of the AND gate 4 is coupled to a divider 6 whose output is coupled to the comparison circuit 8. The delay 9 adds a delay to the received data signal to compensate for any delay in the AND gate 4 and divider 6.

The clock signal B is faster than the received data signal by a predetermined amount, and the divider 6 is arranged to divide the output signal C from the AND gate 4 by this predetermined amount. For example, in a digital communications system having a data rate of 1Mbit/s, a 16Mbit/s clock can be used to produce the clock signal B which is sixteen times faster than the received data rate, in which case, the divider 6 is a divide by 16 counter. Such frequency crystals are readily available and inexpensive. It will be appreciated that the predetermined amount may take values other than 16 and this has been chosen for illustrative purposes only.

The output signal D from the divider 6, in addition to being fed to the comparison circuit 8, is also fed to the other parts of the transceiver circuit: this signal D (RX clock) is used as the system clock to synchronise to the received data signal.

The output of the comparison circuit 8 is coupled to enable circuitry 12 which has an output coupled to delay circuitry 14. Delay circuitry 14 comprises means by which a series of predetermined delays can be selectively introduced into the clock signal path B. In the preferred embodiment such means comprise a series of flip-flops (see FIG. 4) but other means would be apparent to a person skilled in the art. In response to the output signal E from the comparison circuit 8, the enable circuitry 12 selectively enables the series of flip-flops of the delay circuitry 14 so as to introduce predetermined delays in the clock signal B path: the selection of which of the series of flip-flops are to be enabled is determined by the signal E. The delay could of course by zero.

The operation of the clock synchronisation circuit 2 will now be described with reference to FIGS. 3a–3f.

Figure 3:
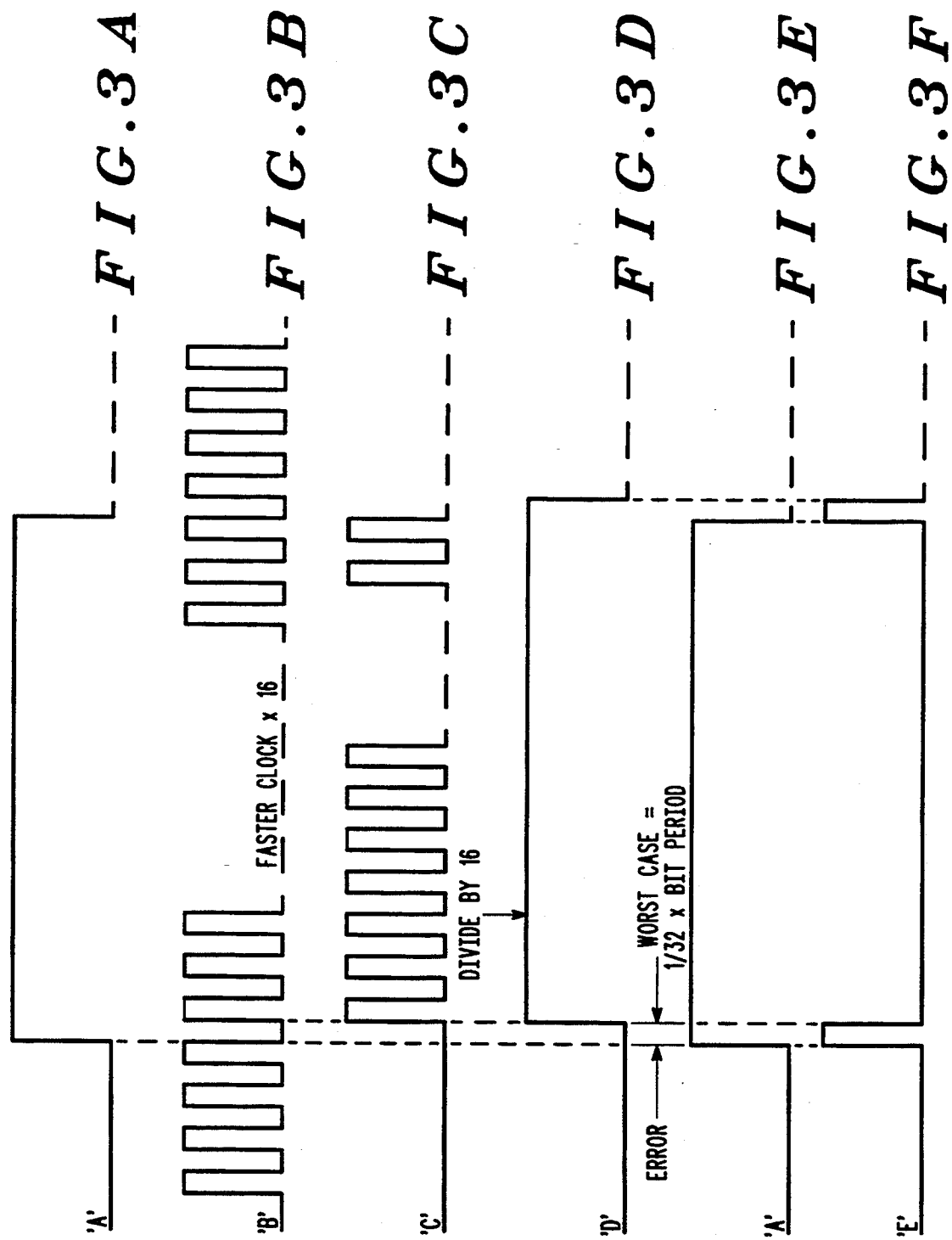
FIG. 3a–3f show timing diagrams for the circuit of FIG. 1 of FIG. 2.

As discussed in the introduction, the transceiver uses the synchronisation word which precedes the data in order to synchronise its system clock to the incoming data. FIG. 3a shows one bit of the synchronisation word which is fed to the AND gate 4. The received data signal A is ANDed together with the clock signal B (FIG. 3b), which in the preferred embodiment is 16 times faster than the received data signal A, to produce output signal C (FIG. 3c). The output signal C is divided by 16 in the divider 6 to produce the signal D which is coupled to the comparison circuit 8. Signal D is an estimate of the synchronisation clock signal (hereinafter referred to as the 'rough synch' clock) and has a worst case error in this case of approximately 1/32 of the bit period of the received data signal A.

The timing error between the 'rough synch' clock and the received synchronisation word is determined by comparing the signal D with the received synchronisation word A in the comparison circuit 8. The comparison circuit 8 generates an error signal E (FIG. 3f) having pulses with widths equal to the error between the synchronisation word A and the clock signal B. In the preferred embodiment, comparison circuit 8 comprises an exclusive OR gate. The successive error pulses are then used by the enable circuitry 12 to selectively enable the delay circuitry 14 so as to introduce the predetermined delays.

Figure 4:
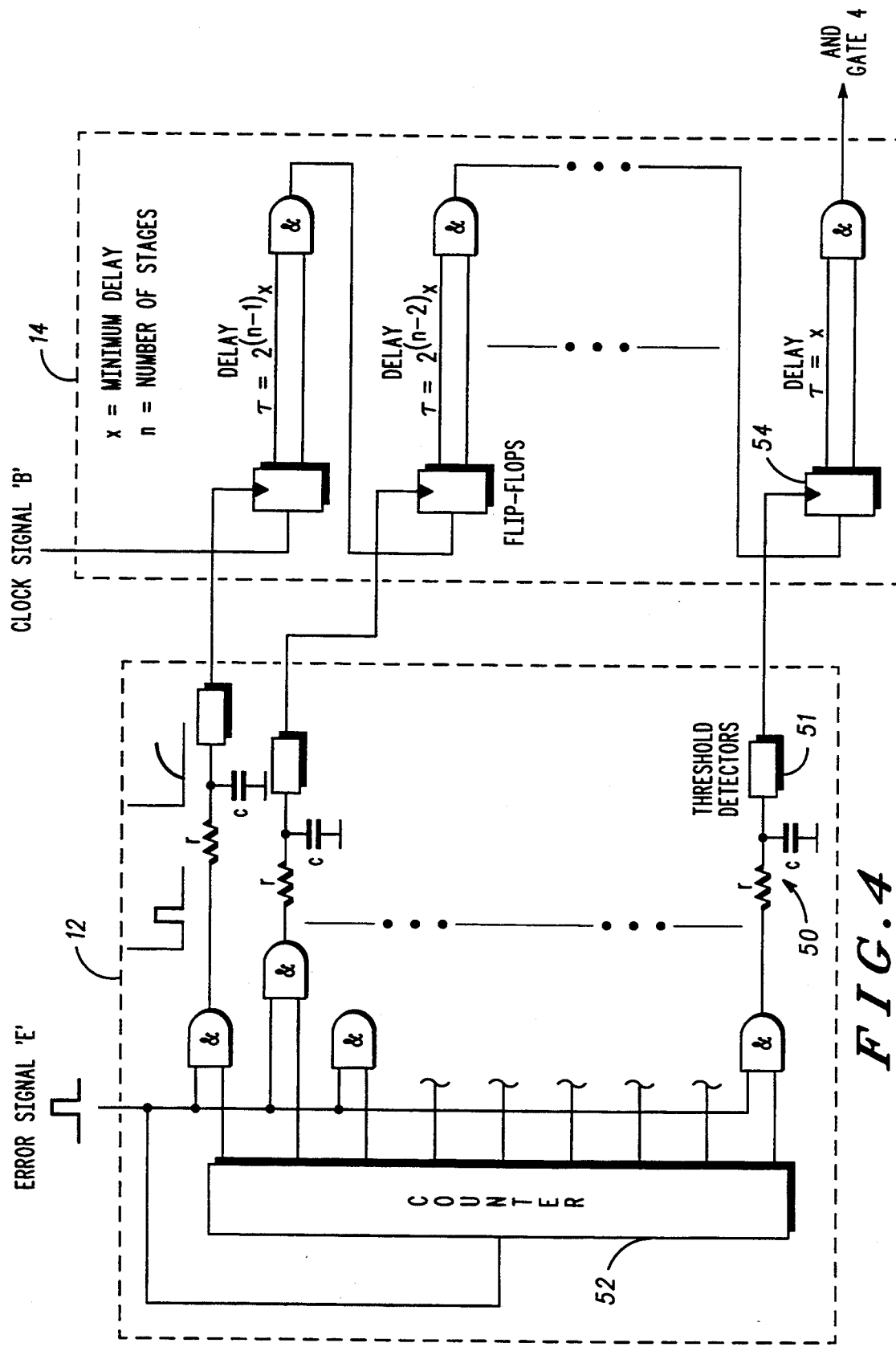
FIG. 4 shows a block schematic diagram of part of the first clock synchronisation circuit of FIG. 1.

Referring now also to FIG. 4, in the preferred embodiment the enable circuitry 12 comprises a series of RC filters 50 with different bandwidths coupled to a counter 52. Each RC filter 50 has an associated threshold detector 51. The bandwidth of each of the RC filters will be of a similar ratio to the delay introduced by the respective flip-flop path. The counter 52 is incremented or decremented each time it receives an error signal E from the comparison circuit 8 and each count of the counter selects a different filter in the series of filters. The counter and series of filters are also coupled to the series of flip-flops 54 of the delay circuitry 14 which are selectively enabled in response to the count of the counter and the output from the filters. The output of each filter is coupled to a predetermined number of flip-flops. A flip-flop is enabled if the width of the error signal E is wide enough so that after passing through the filter it can still provide a large enough output signal to enable the flip-flop.

The operation of the enable circuitry 12 and delay circuitry 14 is as follows.

On receipt of an error signal, the counter 52 is incremented or decremented by one. The count of the counter selects one of the filters. If the width of the error signal is large enough, the output of the selected filter enables a predetermined number of flip-flops so as to introduce a predetermined delay into the clock signal B. The next error signal is generated on the next transition of the synchronisation word by combining the delayed (or not delayed if the filter output was not sufficient to enable the flip-flops) clock signal with the synchronisation word. On receipt of the next error signal, the counter will be incremented or decremented by one and therefore a different filter will be selected having a bandwidth which is less than the previous filter. If the width of the next error signal is large enough the output of the selected filter enables a predetermined number of flip-flops whereby a different delay will be introduced into the clock signal path.

As these delays are introduced into the clock signal B using the transitions of the synchronisation word, the error pulse widths of the error signal E are successively reduced. This gradual reduction of the error pulses is accomplished during the period of the synchronisation word. If on the first transition of the synchronisation word or on subsequent transitions, the width of the error signal is small enough that no delay or additional delay need be introduced, then none or no more of the flip-flops are enabled respectively. It will be appreciated that it may only require one transition of the synchronisation word (i.e. one 'loop' round the synchronisation circuit 2) before synchronisation is achieved or none in which case the clock signal B is already accurately synchronised to the received data signal so that no delay need be introduced by delay circuitry 14.

It will be appreciated that the method of synchronising described above may be carried out in response to the rising transition of the synchronisation word or the falling transition. It may also be carried out in response to both transitions thereby reducing the period in which synchronisation will occur.

It will be appreciated that once the data has been received or if a synchronisation bit in the synchronisation word is found to be incorrect, the digital communications system is reset.

Figure 2:
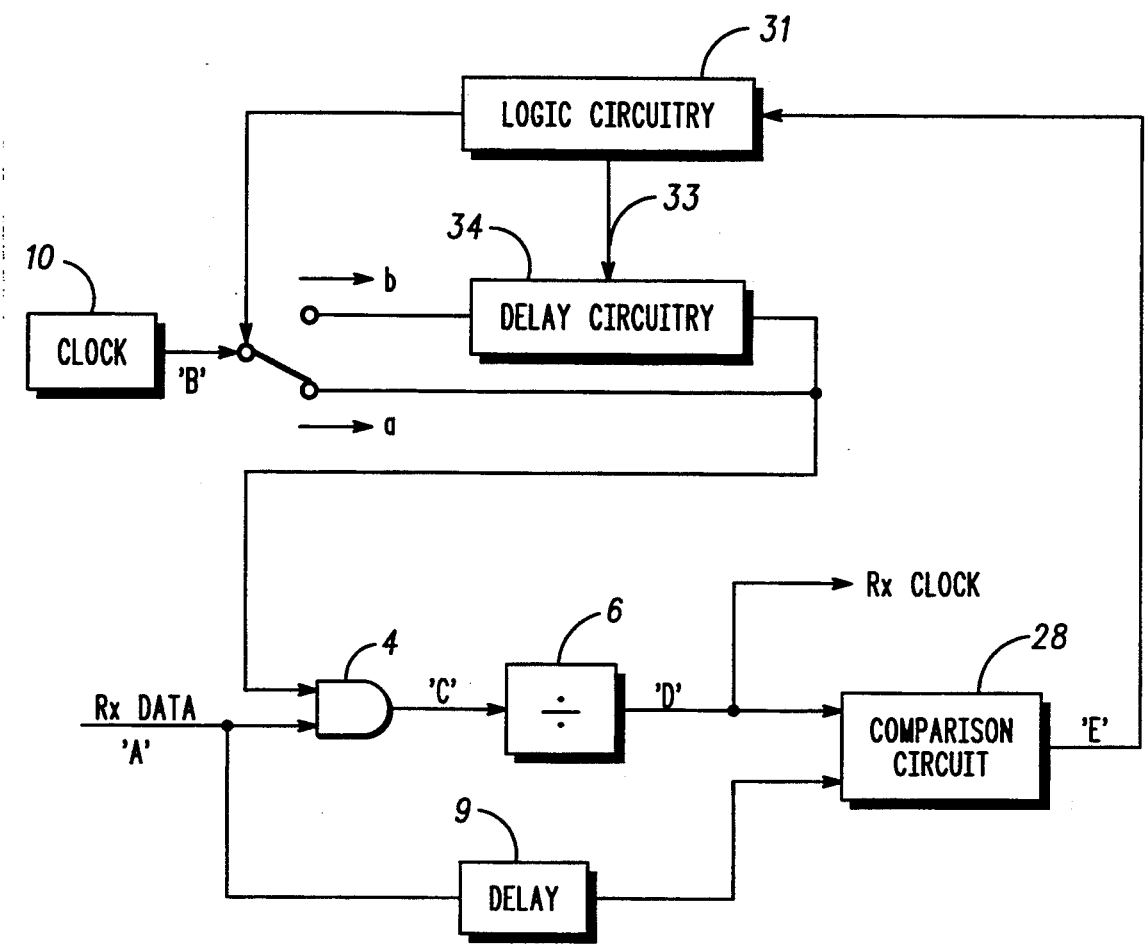
FIG. 2 shows a block schematic diagram of a second clock synchronisation circuit of a digital communications system in accordance with the present invention.

Referring now also to FIG. 2, a second clock synchronisation circuit 22 in accordance With the invention is shown. The second clock synchronisation circuit 22 is similar to the first clock synchronisation circuit 2 described above except that the enable circuitry 12 is replaced by logic circuitry 31. However, like components to those of FIG. 1 are referenced by the same reference numeral plus the number 20.

In response to the first transition of the received synchronisation word, the error signal E is generated in an identical way to that described above for the first clock synchronisation circuit 2 with reference to FIGS. 3a–3f.

The logic circuitry 31, which may comprise a series of RC filters and logic gates, is coupled to the comparison circuit 28 and on receipt of the error signal E, logic circuitry 31 determines its width and thereby the delay which must be introduced into the clock signal path B in order to achieve synchronisation. If the width of the error signal E is substantially zero, the logic circuitry 31 provides an output signal so that the clock signal takes path 'a' (FIG. 2) with no added delay. If the width is non-zero, the clock signal B takes path 'b' in response to the output of logic circuitry 31.

The logic circuitry 31 provides signals via a line 33 to the delay circuitry 34 to selectively enable the flip-flops so as to introduce the delay corresponding to the width. Thus, the second clock synchronisation circuit 22 ensures that clock synchronisation is achieved at the most after one transition of the synchronisation word. This provides a distinct advantage in digital communications systems using very short synchronisation words.

Thus, the embodiments of the present invention ensure that at the end of the synchronisation word, the clock signal B is accurately synchronised to the received data signal so that the bit error rate of the transceiver for the following data is at a minimum. It achieves this by not only recognising the synchronisation word, but also using the synchronisation word to achieve synchronisation.

In summary, the present invention provides a means and method by which any clock error in digital communications systems, particularly those at data rates above 100Kbits/s, can be eradicated simply and cheaply and without the need for large power consuming circuits and expensive fast running crystals.

It will be appreciated that the invention also allows flexibility for the system designer who can decide the accuracy required in each of the ANDing, dividing, comparing etc. steps given the particular digital communications system constraints.

It will also be appreciated that the present invention is applicable to all digital communication systems requiring clock synchronisation. Furthermore, although the invention has been described with reference to a transceiver, the invention is also applicable to receivers.

I claim:

1. A method of synchronising a clock signal with a received data signal in a digital communications system, the clock signal having a signal frequency which is greater than the signal frequency of the received data signal by a predetermined amount, the method comprising the steps of:

a) logically combining the clock signal with the received data signal to provide a synchronisation signal;

b) comparing the synchronisation signal with the received data signal and generating an error signal dependent on the difference between the synchronisation signal and the received data signal; and c) delaying the clock signal in response to the error signal so as to reduce the difference between the synchronisation signal and the received data signal.

2. The method according to claim 1 further comprising a first step of generating the clock signal in response to a first transition of the received data signal.

3. The method according to claim 2 wherein steps a), b) and c) are repeated with the delayed clock signal being logically combined with the received data signal until the synchronisation signal is synchronised to the received data signal.

4. The method according to claims 3 wherein the received data comprises a synchronisation word followed by data and the steps a), b) and c) are repeated in response to the rising and falling transitions of the synchronisation word.

5. The method according to claim 1 wherein the delaying step comprises:

determining the difference between the synchronisation signal and the received data signal from the error signal; and introducing a delay corresponding to the determined difference so that the synchronisation signal is synchronised to the received data signal.

6. The method according to claim 1 wherein said logically combining step b) comprises the steps of:

ANDing the clock signal with the received data signal to provide a combined signal; and dividing the combined signal by the predetermined amount to provide the synchronisation signal.

7. A clock synchronisation circuit for synchronising a clock signal to a received data signal in a digital communications system, the clock signal having a signal frequency which is greater than the signal frequency of the received data signal by a predetermined amount, comprising:

a clock for providing the clock signal;

logic means for logically combining the clock signal with the received data signal to provide a synchronisation signal, the synchronisation signal providing synchronisation for the digital communications system;

comparing means for comparing the synchronisation signal with the received data signal and for generating an error signal in response to the difference therebetween; and delay circuitry coupled to the clock and logic means for delaying the clock signal in response to the error signal so as to reduce the difference between the synchronisation signal and the received data signal.

8. A clock synchronisation circuit according to claim 7 wherein said logic means comprises;

an AND gate having a first input for receiving the received data signal and a second input for receiving the clock signal and an output; and a divider having an input coupled to the output of the AND gate, a first output coupled to the comparing means and a second output for providing synchronisation for the digital communications system, the divider being arranged to divide the ANDed signal from the output of the AND gate by the predetermined amount.

9. A clock synchronisation circuit according to claim 7 wherein the delay circuitry comprises:

means for determining the difference between the synchronisation signal and the received data signal from the error signal; and delay means for introducing a delay corresponding to the determined difference so that the synchronisation signal is synchronised to the received data signal.

10. A clock synchronisation circuit according to claim 7 wherein the delay circuitry comprises:

a counter whose count is changed on receipt of an error signal;

a plurality of filters, each of the filters having a predetermined bandwidth and being selectable according to the count of the counter, a selected filter providing an enable signal when the size of the error signal is greater than a predetermined value dependent on the predetermined bandwidth; and a plurality of flip-flops coupled to the plurality of filters such that each of the filters has a predetermined number of the flip-flops associated therewith, a predetermined number of flip-flops being enabled in response to an enable signal from the associated filter whereby a predetermined delay is introduced into the clock signal.

11. A clock synchronisation circuit according to claim 7 wherein said comparing means comprises a exclusive OR gate.

12. A clock synchronisation circuit according to claim 7 wherein the clock provides the clock signal in response to a first transition of the received data signal.

13. A clock synchronisation circuit according to claim 7 for use in a receiver of a burst-mode TDMA system.

14. A method of synchronising a clock signal according to claim 1 for use in a receiver of a burst-mode TDMA system.

* * * * *